United States Patent [19]

Papendieck et al.

[11] 4,250,561
[45] Feb. 10, 1981

[54] APPARATUS FOR RECEIVING AND/OR DELIVERING SIGNALLING CHARACTERS EACH HAVING A PLURALITY OF POLARITY CHANGES

[75] Inventors: Friedrich Papendieck; Guenther Kerschner; Rolf-Peter Verfuerth; Jüergen Rabold, all of Munich, Fed. Rep. of Germany

[73] Assignee: Siemens Aktiengesellschaft, Berlin & Munich, Fed. Rep. of Germany

[21] Appl. No.: 972,653

[22] Filed: Dec. 26, 1978

[51] Int. Cl.³ .......................... G06F 5/04; G06F 3/00
[52] U.S. Cl. ......................................... 364/900; 178/3
[58] Field of Search ... 364/200 MS File, 900 MS File; 178/3

[56] References Cited
U.S. PATENT DOCUMENTS

| | | | |
|---|---|---|---|
| 3,400,375 | 9/1968 | Bowling et al. | 364/200 |
| 3,516,074 | 6/1970 | Enomoto et al. | 364/200 |
| 3,559,184 | 1/1971 | Rawlings et al. | 364/200 |
| 3,651,484 | 3/1972 | Smeallie | 364/200 |
| 3,717,723 | 2/1973 | Jaskulke et al. | 178/3 |
| 3,906,151 | 9/1975 | Grossman et al. | 178/3 |
| 4,064,360 | 12/1977 | Koenig | 178/3 |

FOREIGN PATENT DOCUMENTS 1164558 9/1969 United Kingdom .
1164954 9/1969 United Kingdom .

OTHER PUBLICATIONS
Siemens System Eds., Ref. No. F234/150.18.101, 10/77, pp. 4-9, 19-22 and 38-44.

*Primary Examiner*—Harvey E. Springborn
*Attorney, Agent, or Firm*—Hill, Van Santen, Steadman, Chiara & Simpson

[57] ABSTRACT

A conversion structure is provided for converting polarity changes into digital characters and digital characters into polarity changes. The structure includes a conversion circuit which is connected to a termination circuit by way of a memory unit, a communications control unit, and a second termination circuit which operates as an interface. Memory cells are assigned to receive incoming information and transmit the same to the conversion circuit and to receive outgoing information from the conversion circuit and transmit the same to the outgoing side of the termination circuit. The conversion circuit comprises an input code converter, and output code converter and a chain of series/parallel converters and parallel/series converters therebetween. The series/parallel converters receive polarity changes and convert the same into a digital character. Conversely, the parallel/series converters receive complete digital characters in parallel and process the same into a series of polarity changes.

1 Claim, 1 Drawing Figure

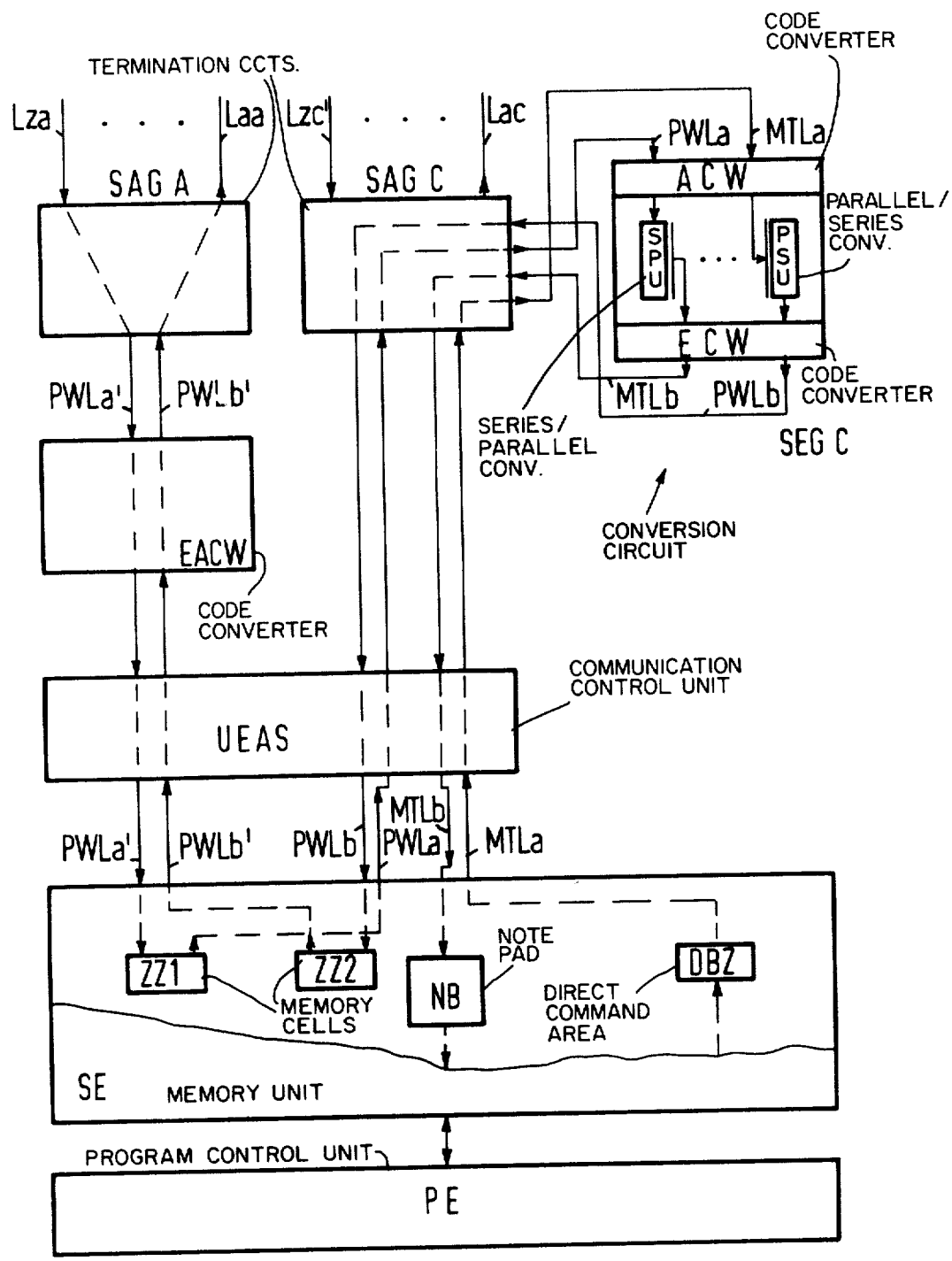

APPARATUS FOR RECEIVING AND/OR DELIVERING SIGNALLING CHARACTERS EACH HAVING A PLURALITY OF POLARITY CHANGES

BACKGROUND OF THE INVENTION

1. Field of the Invention

The present invention relates to a circuit arrangement for the acceptance and/or delivery of signaling characters respectively consisting of a plurality of polarity changes by way of at least one termination circuit accepting and/or delivering signals in the form of polarity changes in a program-controlled data switching system, to which at least one memory unit, controlled by a program control unit, is connected, which memory unit comprises the memory cells individually allocated to the offering lines transmitting polarity changes in the incoming direction or, respectively, serving lines transmitting in the outgoing direction respectively connected to the termination circuit.

2. Description of the Prior Art

A circuit arrangement of the type generally described above is known in the art from German Letters Pat. No. 1,298,118. In this known circuit arrangement, it is determined on the basis of the signaling characters respectively collected at a central location whether and, if so, which control processes are to be undertaken with reference to the individual connections. Altogether, however, this represents a relatively high loading of the central installations carrying out such a control. The reason for this lies, particularly, in that for the processing of the individual polarity changes belonging to the signaling character a corresponding plurality of processing cycles must be offered at the central location, which cannot always be guaranteed with a heavy loading of the central installations.

SUMMARY OF THE INVENTION

The object of the present invention, therefore, is to provide a manner in which, in a circuit arrangement of the type generally mentioned above, a processing of polarity changes forming signaling characters can be undertaken in a relatively simple manner.

The above object is achieved, in a circuit arrangement of the type generally mentioned above, in that a conversion circuit accepting polarity changes, on the one hand, and then delivering signaling characters, and accepting signaling characters, on the other hand, and then delivering polarity changes, is connected with the respective memory unit, which can be allocated, case-by-case, to the offering and serving lines connected to the respective termination circuit.

In practicing the present invention, the advantage is provided that, with a relatively small circuit expense, one can make do with a smaller number of processing cycles at the central location in order to accept or, respectively, deliver the respective signaling character. It is of further advantage that the conversion circuit constructed in accordance with the present invention can be and also will be provided in a smaller plurality than corresponds to the plurality of offering and serving lines by way of which polarity changes are transmitted.

In accordance with a practical embodiment of the invention, the conversion circuit is provided as an extension circuit of a termination circuit to which offering lines transmitting polarity changes in the incoming transmission direction and serving lines transmitting polarity changes in outgoing transmission direction are respectively connected and which converts the polarity changes supplied thereto by way of such an offering line into characters and delivers these characters to the respective memory unit and which converts characters delivered from the memory unit into polarity changes for delivery by way of one of the supply lines concerned. This provides an advantage that one can manage with a particularly small circuit technical expense for the connection of the conversion circuit.

In accordance with a feature of the invention, the conversion circuit having a polarity change input which accepts polarity changes is connectible with the output of a memory cell serving as an offering cell in the memory unit, which memory cell is assigned on its input side to an offering line connected to a termination circuit. Furthermore, the conversion circuit having a polarity change output for emitting a polarity change is connectible with the input of a memory cell which functions as a serving cell in the memory unit, which memory cell is assigned as its output side to a serving line connected to one of the termination circuits. Moreover, the conversion circuit having a character input for delivering a character is connectible with the input of such a memory area of the memory unit which can be interrogated by the program control unit. Finally, the conversion circuit having a character input for accepting the character is connectible with the output of a further memory area of the memory unit which can be loaded with characters proceeding from the program control unit. With this construction, an advantage is provided in a particularly simple organization of the memory unit for the acceptance and delivery of polarity changes and signaling characters.

BRIEF DESCRIPTION OF THE DRAWING

On the drawing there is a single FIGURE which is a schematic block diagram of the present invention as embodied in a known electronic data switching system.

DESCRIPTION OF THE PREFERRED EMBODIMENTS

Referring to the drawing, portions of a known electronic data switching system are illustrated, for example as disclosed in "Der Fernmelde-Ingenieur", No. 5, May 1972 and in "NTZ", 1973, No. 7, Pages 297–304, which are fully incorporated herein by this reference as material illustrating the environment for practicing the invention. In the present case, only a system termination circuit SAG A, an input/output code converter EACW, a communication control unit UEAS, a memory unit SE and a program control unit PE of the data switching system (EDS) are illustrated. Offering lines transmitting polarity changes in the incoming transmission direction and serving lines transmitting polarity changes in the outgoing transmission direction are connected to the system termination circuit SAG A. An offering line Lza and a serving line Laa are indicated on the drawing. A separate memory cell in the memory unit SE is assigned to each such offering line and each such serving line. In the present case, a memory cell ZZ1 belongs to the offering line and a memory cell ZZ2 belongs to the serving line.

In addition to the basic circuit blocks observed above, the circuit arrangement illustrated on the drawing exhibits a further system termination circuit SAG C, to which polarity changes are supplied by way of offering lines and which delivers polarity changes by way of serving lines. Such an offering line Lzc' and a serving line Lac are indicated on the drawing. The system termination circuit SAG C is connected with the memory unit SE by way of the communication control unit UEAS. By way of this connecting path, information is respectively transmitted character-wise between the system termination circuit SAG C, and the memory unit SE, namely, for the acceptance of polarity changes on one of the offering lines and for the delivery of polarity changes by way of the serving lines of the system termination circuit SAG C. This system termination circuit SAG C, therefore, fulfills conversion functions.

In addition to the basic circuit blocks discussed above, another conversion circuit SEG C is illustrated on the drawing, which can be viewed as an extension circuit of the previously-considered system termination circuit SAG C. In the present case, the termination system circuit SAG C serves only as an interface circuit for the conversion circuit SEG C. Thereby, one can manage with a relatively simple construction of the conversion circuit SEG C. On the other hand, however, it would also be possible to directly connect the conversion circuit SEG C to the communication control unit or to the memory unit with a correspondingly constructed interface circuit.

On its output side, the conversion circuit SEG C has a code converter ECW which is capable of accepting, and on its output side, delivering both polarity changes as well as signaling characters consisting of a plurality of polarity changes. Furthermore, the conversion circuit SEG C has a code converter ACW provided on its output side for accepting and delivering polarity changes and signaling characters consisting of a plurality of polarity changes supplied thereto. A chain of series/parallel converters and parallel/series converters are located between the code converter ECW and the code converter ACW of the conversion circuit SEG C. Such a series/parallel converter SPU and such a parallel/series converter PSU are indicated on the drawing.

In addition to the aforementioned memory cells, the memory unit SE further comprises two memory areas which are essential to the present invention. One of these memory areas in referenced NB and constitutes a note pad memory area in which characters consisting of a plurality of polarity changes are immediately stored before such characters are processed by the program control unit PE. The other memory area is a direct command memory area DBZ which, upon being driven by the program control unit PE, is operable to deliver characters consisting of a plurality of polarity changes. Characters which the memory area NB is able to accept and which the memory area DBZ is able to deliver are signaling characters, which are also designated as micromessages.

In the following, the operation of the circuit arrangement illustrated on the drawing will be discussed in greater detail. Thereby, it is considered as being sufficient to enter into details concerning only the specific functions which ensue from the use of the conversion circuit SEG C in the illustrated circuit arrangement. The general functions of the other basic circuit blocks of the circuit arrangement illustrated on the drawing are sufficiently known from the publications cited above.

For explaining the operation of the circuit arrangement illustrated on the drawing, let it be assumed that polarity changes which belong to signaling characters are supplied via the offering line Lza of the system termination circuit SAG A. These polarity changes are delivered from the system termination circuit SAG A to the memory unit SE by way of a line PWLa', namely, by way of the input/output code converter EACW and the communication control unit UEAS. In the memory unit SE, each such polarity change is written into the memory cell ZZ1 belonging to the offering line Lza, which memory cell can thus be viewed as an offering cell. From this memory cell ZZ1 of the memory unit SE, each polarity change accepted by the memory cell is retransmitted to the conversion circuit SEG C at that moment allocated to the offering line concerned via a line PWLa, namely, by way of the communication control unit UEAS and the system termination circuit SAG C. To that end, the conversion circuit SEG C can be connected to the line PWLa with a polarity change input.

The polarity changes successively delivered from the offering cell ZZ1 arrive in one of the series/parallel converters SPU by way of the output code converter ACW of the conversion circuit SEG C. When polarity changes in the polarity forming a signaling character have been accepted by the series/parallel converter SPU in the conversion circuit SEG C, then the series/parallel converter SPU delivers a complete character or, respectively, micromessage on its output side by way of the code converter ECW to a character output which is connectible with the memory SE by way of a line MTLb (provided in multiple, if necessary), and, again, namely by way of the system termination circuit SAG C and the communication control unit UEAS. Characters supplied in this manner are written into the note pad memory area NB in the memory unit SE in order to then be at the disposal of the program control unit PE.

In the discussion above, the case has been considered that polarity changes forming signaling characters have been accepted via the offering line Lza and that such signaling characters have been supplied to the memory unit SE enblock so to speak. Now, the case is to be considered that such signaling characters are delivered from the memory unit SE and that the polarity changes forming the signaling characters are retransmitted by way of the serving line Laa. The memory unit SE emits such signaling characters from its direct command memory area DBZ upon a corresponding control from the program control unit PE. These signaling characters arrive at a character input of the conversion circuit SEG C again assigned to the serving line Laa by way of a line MTLa and the communication control unit UEAS and the system termination circuit SAG C. By way of the code converter ACW, these signaling characters are into a parallel/series converter PSU in the system termination circuit, which then, upon a corresponding control, delivers individual polarity changes on its output side at a polarity change output to a line PWLb via the input code converter ECW. The line PLWb is connectible by way of the system termination circuit SAG C and the communication control unit UEAS with the memory cell ZZ2 of the memory unit SE representing a serving cell in such a manner that the individual polarity changes are successively written into this memory cell which is assigned to the serving line Laa. The memory cell ZZ2 is assigned on its output side to the serving line Laa of the system termination circuit SAG A by way of a line PWLb' and, namely, by way of the communication control unit UEAS and the input/output code converter EACW.

In the manner described above, therefore, signaling characters consisting of individual polarity changes delivered from the memory unit SE are delivered polarity-change-wise by way of one of the serving lines connected with the system termination circuit SAG A. The control of the processes thereby taking place in the memory unit SE and in the remaining basic circuit blocks illustrated on the drawing occurs by means of the program control unit PE just as in the case that polarity changes forming signaling characters are accepted by way of the offering lines of the system termination circuit SAG A and are supplied to the memory unit SE as complete signaling characters. However, the control functions connected herewith are not being treated in further detail since these functions basically correspond with the functions that are described in conjunction with the program control unit PE in the publication mentioned above. It should be pointed out, however, that the above-indicated system termination circuits SAG A and SAG C can also be respectively viewed as system termination groups and that the conversion circuit SEG C can be viewed as a conversion circuit group.

Although we have described our invention by reference to particular illustrative embodiments thereof, many changes and modifications of the invention may become apparent to those skilled in the art without departing from the spirit and scope of the invention. We therefore intend to include within the patent warranted hereon all such changes and modifications as may reasonably and properly be included within the scope of our contribution to the art.

We claim:

1. In a circuit arrangement for accepting and/or delivering signaling characters each of which are constituted by a plurality of polarity changes, the circuit arrangement being of the type in which at least one termination circuit accepts and/or delivers signals in the form of polarity changes in a program-controlled data switching system and in which a memory unit which includes a plurality of memory cells is provided and controlled by a program control unit, and incoming and outgoing lines connected to the termination circuit, in combination therewith the improvement comprising:

said memory cells individually assigned to said incoming and outgoing lines;

a conversion circuit connected to the memory unit for receiving polarity changes from said memory cells and emitting polarity changes to said memory cells and for converting parallel character data into polarity changes and polarity changes into parallel character data;

a further termination circuit and a plurality of incoming and outgoing lines connected thereto and operating as an interface between the first-mentioned termination circuit and said conversion circuit;

the memory unit further including first and second memory areas;

said conversion circuit including a polarity change input for receiving polarity changes connectible to the output of a first memory cell which serves as an incoming cell and which is assigned to an incoming line connected to the first-mentioned termination circuit;

said conversion circuit including a polarity change output connectible with the input of a second memory cell which serves as an outgoing cell and which is assigned to an outgoing line which is connected to the first-mentioned termination circuit;

said conversion circuit including a character data output which is connectible to said first memory area and which is interrogated by the program control unit;

said conversion circuit further including a character data input for receiving character data connectible to the output of said second memory area which is selectively loaded by said program control unit; and said conversion circuit further including a first code converter, a second code converter, and a chain of serial/parallel and parallel/serial converters connected between said first and second code converters for respectively converting pulse changes into parallel data and parallel data into pulse changes.

* * * * *